(12) United States Patent
van de Beek et al.

(10) Patent No.: US 9,686,041 B2
(45) Date of Patent: *Jun. 20, 2017

(54) END OF COMMUNICATION DETECTION

(71) Applicant: NXP B.V., Eindhoven (NL)

(72) Inventors: Remco van de Beek, Eindhoven (NL); Massimo Ciacci, Den Bosch (NL); Ghiath Al-kadi, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/841,644

(22) Filed: Aug. 31, 2015

(65) Prior Publication Data

US 2015/0372787 A1    Dec. 24, 2015

Related U.S. Application Data

(63) Continuation of application No. 14/136,813, filed on Dec. 20, 2013, now Pat. No. 9,124,393.

(51) Int. Cl.
*H04B 5/00*    (2006.01)
*H04L 5/12*    (2006.01)
(Continued)

(52) U.S. Cl.
CPC .......... *H04L 1/0039* (2013.01); *G06K 19/067* (2013.01); *H04B 5/0031* (2013.01); *H04B 5/0062* (2013.01); *H04B 5/0093* (2013.01); *H04L 7/041* (2013.01); *H04L 7/042* (2013.01); *H04L 27/22* (2013.01); *H04L 27/227* (2013.01); *H04L 27/2272* (2013.01);
(Continued)

(58) Field of Classification Search
CPC ..................... H04L 1/0039; H04L 5/12; H04L 2025/03401; H04L 27/18–27/2278; H04B 5/0031

See application file for complete search history.

(56) References Cited

U.S. PATENT DOCUMENTS 5,376,894 A * 12/1994 Petranovich .......... H04L 7/0331
                                                              329/306
5,410,315 A *  4/1995 Huber .................... G01S 13/753
                                                              340/10.3
(Continued)

FOREIGN PATENT DOCUMENTS

CA       13360367    10/1992
EP       1414207 A1   4/2004

OTHER PUBLICATIONS

Extended European Search Report for EP14193023.0 (May 21, 2015).

*Primary Examiner* — Gennadiy Tsvey

(57) ABSTRACT

An apparatus for detecting the end of a communication is disclosed. The apparatus includes an interface circuit for receiving an encoded signal and a carrier signal recovery circuit coupled to an output of the interface circuit. The carrier signal recovery circuit is configured to output a carrier signal of the encoded signal and a second signal that is out of phase with the carrier signal. The apparatus also includes a decoding circuit configured to decode the encoded signal as a function of both the encoded signal and the carrier signal output by the carrier signal recovery circuit. The apparatus also includes a detection circuit configured to detect an indication of an end of a communication in the encoded signal as a function of both the encoded signal and the second signal.

19 Claims, 8 Drawing Sheets

(51) Int. Cl.
    *H04L 27/22*     (2006.01)
    *H04L 1/00*      (2006.01)
    *G06K 19/067*    (2006.01)
    *H04L 7/04*      (2006.01)
    *H04L 27/227*    (2006.01)
    *H04L 27/00*     (2006.01)
    *H04L 5/00*      (2006.01)

(52) U.S. Cl.
    CPC ........ *H04L 27/2273* (2013.01); *H04L 5/001* (2013.01); *H04L 2027/0036* (2013.01); *H04L 2027/0057* (2013.01); *H04L 2027/0095* (2013.01)

(56) References Cited

U.S. PATENT DOCUMENTS

| | | | | |
|---|---|---|---|---|
| 5,457,461 | A * | 10/1995 | Schuermann | G01S 13/758 342/42 |
| 5,504,454 | A * | 4/1996 | Daggett | H02J 13/0027 329/304 |
| 5,550,548 | A * | 8/1996 | Schuermann | G01S 13/758 342/42 |
| 5,577,056 | A * | 11/1996 | Malik | H04J 3/0605 375/324 |
| 7,003,407 | B1 * | 2/2006 | Kari | G06K 19/0723 370/506 |
| 8,369,786 | B2 | 2/2013 | Witschnig et al. | |
| RE44,415 | E * | 8/2013 | Park | G06K 19/0723 375/329 |
| 8,538,481 | B2 | 9/2013 | Meindl et al. | |
| 2001/0028691 | A1 * | 10/2001 | Posch | G06K 7/0008 375/340 |
| 2004/0125901 | A1 * | 7/2004 | Nakahara | H04L 7/041 375/368 |
| 2008/0112885 | A1 * | 5/2008 | Okunev | A61B 1/00016 424/9.1 |
| 2008/0230612 | A1 * | 9/2008 | Nakabe | G06K 19/0723 235/492 |
| 2008/0231424 | A1 | 9/2008 | Arnitz | |
| 2009/0174592 | A1 * | 7/2009 | Muellner | H04B 1/00 342/51 |
| 2009/0195366 | A1 * | 8/2009 | Meier | G06K 7/10297 340/10.51 |
| 2010/0196015 | A1 * | 8/2010 | Gutin | H04B 10/85 398/141 |
| 2010/0202494 | A1 * | 8/2010 | Roh | H04B 1/7176 375/132 |
| 2010/0290368 | A1 * | 11/2010 | Meier | G06K 19/07749 370/278 |
| 2012/0208459 | A1 | 8/2012 | Burtt | |
| 2013/0249675 | A1 | 9/2013 | van den Berge et al. | |
| 2013/0331047 | A1 * | 12/2013 | Kanemoto | G06F 1/3228 455/127.1 |
| 2015/0074465 | A1 * | 3/2015 | Pfeffer | G06F 11/3041 714/42 |

* cited by examiner

END OF COMMUNICATION DETECTION

CROSS-REFERENCE TO RELATED APPLICATIONS

This application is a continuation of and claims priority to, U.S. patent application Ser. No. 14/136,813, filed on Dec. 20, 2013, which is incorporated by reference herein in its entirety for all purposes.

FIELD

Aspects of various embodiments are directed to wireless communication of data.

BACKGROUND

Wireless communication is widely used in a variety of applications. For example, near field communication (NFC) is a short-range wireless technology (distances measured in centimeters) that is optimized for intuitive, easy, and secure communications between various devices such as smartphones, radio frequency identification (RFID) tags, and similar devices. Applications include, among others, contactless transactions, data exchange, and simplified setup of more complex communications such as WiFi.

SUMMARY

Various example embodiments are directed to wireless communication circuits and their implementation. Such embodiments may be implemented to address challenges related to detecting the end of a communication.

In connection with one or more embodiments, an apparatus is provided for detecting the end of a communication. The apparatus includes an interface circuit for receiving an encoded signal. The apparatus also includes a carrier signal recovery circuit coupled to an output of the interface circuit. The carrier signal recovery circuit determines and outputs a carrier signal of the encoded signal. The carrier signal recovery circuit also generates and outputs a second signal that is out of phase with the carrier signal. The apparatus includes a decoding circuit, coupled to the output of the interface circuit and to the carrier signal recovery circuit. The decoding circuit decodes the encoded signal as a function of both the encoded signal and the carrier signal output by the carrier signal recovery circuit. The apparatus also includes a detection circuit, coupled to the output of the interface circuit and to the carrier signal recovery circuit. The detection circuit detects an indication of an end of a communication in the encoded signal as a function of both the encoded signal and the second signal.

In connection with one or more embodiments, a method for detecting the end of a communication is also provided. A carrier signal of an encoded signal is determined. The carrier signal is phase-shifted to produce a second signal that is out of phase with the carrier signal. The encoded signal is decoded as a function of both the encoded signal and the carrier signal. An indication of an end of a communication is detected in the encoded signal by comparing the second signal with the encoded signal.

In connection with one or more embodiments, a near-field communication (NFC) device is provided. The NFC device includes an interface circuit having a loop antenna for receiving an encoded signal. The interface circuit also includes a power supply coupled to the loop antenna. The power supply generates a power supply voltage from the encoded signal received by the loop antenna. The NFC device includes a carrier signal recovery circuit coupled to an output of the interface circuit. The carrier signal recovery circuit determines and outputs a carrier signal of the encoded signal. The carrier signal recovery circuit also generates and outputs a second signal that is out of phase with the carrier signal. The NFC device apparatus also includes a decoding circuit, coupled to the output of the interface circuit and to the carrier signal recovery circuit. The decoding circuit decodes the encoded signal as a function of both the encoded signal and the carrier signal output by the carrier signal recovery circuit. The NFC device also includes a detection circuit, coupled to the output of the interface circuit and to the carrier signal recovery circuit. The detection circuit detects an indication of an end of a communication in the encoded signal as a function of both the encoded signal and the second signal.

The above discussion/summary is not intended to describe each embodiment or every implementation of the present disclosure. The figures and detailed description that follow also exemplify various embodiments.

BRIEF DESCRIPTION OF THE DRAWINGS

Various example embodiments may be more completely understood in consideration of the following detailed description in connection with the accompanying drawings, in which:

FIG. 3-1 shows a first circuit for receiving and processing encoded data, in accordance with one or more embodiments;

FIG. 3-2 shows an example set of signals generated during operation of the circuit shown in FIG. 3-1;

FIG. 4-1 shows a second circuit for receiving and processing encoded data, in accordance with one or more embodiments;

FIG. 4-2 shows an example set of signals generated during operation of the circuit shown in FIG. 4-1;

DETAILED DESCRIPTION

Figure 1:
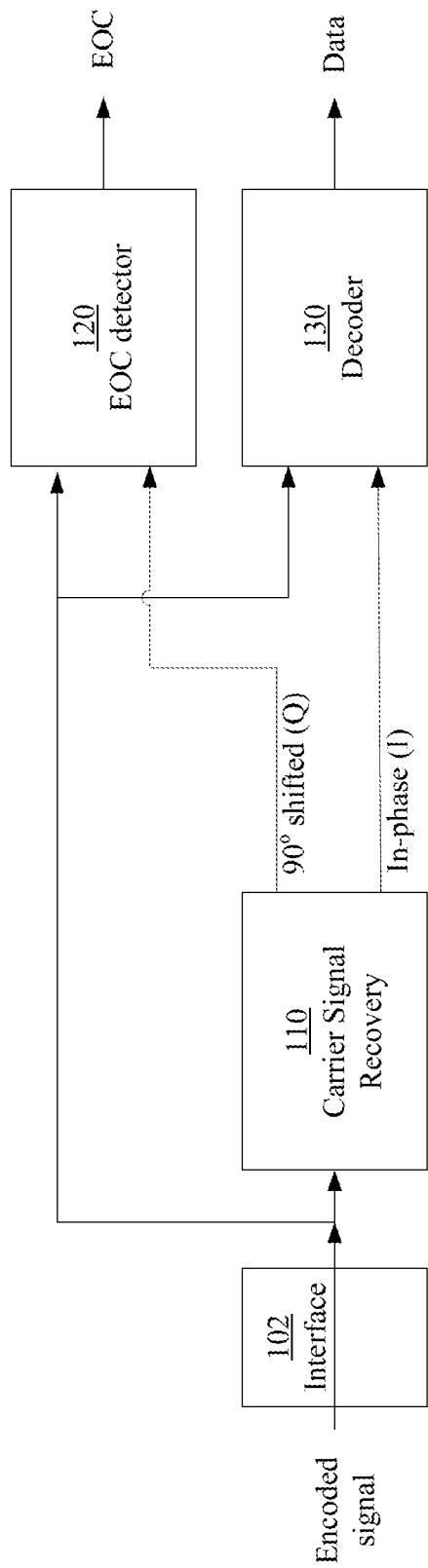
FIG. 1 shows a block diagram of an apparatus for receiving and processing encoded data, in accordance with one or more embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure, including aspects defined in the claims. In addition, the term "example" as used throughout this application is only by way of illustration, and not limitation.

Aspects of the present disclosure are believed to be applicable to a variety of different types of apparatuses, systems, and methods involving wireless communication.

Various example embodiments are directed to methods, devices, and apparatus for detecting an end of a wireless communication.

A hardware-efficient apparatus is disclosed for detecting an indication of the end of a communication in an encoded signal. The apparatus includes a carrier signal recovery circuit, a decoding circuit, and a detection circuit. The carrier signal recovery circuit determines and outputs a carrier signal of the encoded signal and also a phase-shifted version of the carrier signal. The decoding circuit decodes the data symbols of the encoded signal, using the carrier signal provided by the carrier signal recovery circuit. Although the decoding circuit may be adapted to detect symbols indicative of the end of communication, such adaptation will increase the cost of the decoder circuit and is not hardware-efficient. Instead, the apparatus includes a detection circuit that detects an end of communication as a function of the encoded signal and the phase-shifted carrier signal. For example, in some embodiments, the detection circuit may detect a symbol indicative of the end of communication using one of the two signals to trigger sampling of the other. In some implementations, this function may be implemented using a single flip-flop circuit. Using this approach, manufacturing cost may be reduced in comparison to some other approaches, which use a decoder circuit to detect end of communication.

In some embodiments, an apparatus is provided for detecting the end of a communication. The apparatus includes an interface circuit for receiving an encoded signal. The apparatus also includes a carrier signal recovery circuit coupled to an output of the interface circuit. The carrier signal recovery circuit determines and outputs a carrier signal of the encoded signal. The carrier signal recovery circuit also generates and outputs a second signal that is out of phase with the carrier signal. The apparatus also includes a decoding circuit coupled to the output of the interface circuit and to the carrier signal recovery circuit. The decoding circuit decodes the encoded signal as a function of both the encoded signal and the carrier signal output by the carrier signal recovery circuit. A detection circuit is coupled to the output of the interface circuit and to the carrier signal recovery circuit. The detection circuit detects an indication of an end of a communication in the encoded signal as a function of both the encoded signal and the second signal.

The interface circuit may be implemented differently for different applications. In some applications, the interface circuit may include a simple circuit for providing a signal to the carrier signal recovery circuit, the detection circuit and the decoding circuit. In some applications, the interface circuit may include various pre-processing circuits. For example, in some implementations, the interface circuit includes a difference amplifier configured to convert a received differential signal to a single-ended signal. As another example, the interface circuit may alternatively or additionally include one or more band-pass filters for processing a received signal. In some applications, the interface circuit may include an antenna for receiving radio frequency (RF) signals. In some applications, such as a passive RFID device, the interface circuit may also include a power supply for generating a power supply voltage from RF signals induced in the antenna.

In some embodiments, the detection circuit includes a flip-flop having a first terminal (e.g., D input) connected to receive the second signal from the carrier signal recovery circuit and having a second terminal (e.g., a clock input terminal) connected to receive the encoded signal from the interface circuit. In this configuration, the encoded signal is used to trigger sampling of the phase-shifted second signal from the carrier signal recovery circuit.

In some embodiments, the detection circuit includes a flip-flop having a first input terminal (D input) connected to receive the encoded signal from the interface circuit and having an second terminal (clock input) connected to receive the second signal from the carrier signal recovery circuit. In this configuration, the phase-shifted second signal is used to trigger sampling of the encoded signal. In this embodiment, the detection circuit also includes a logical inverter circuit configured to invert the output of the flip-flop.

The carrier signal recovery circuit may include various different circuits for determining the carrier signal of the encoded signal. In some embodiments, the carrier signal recovery circuit also includes a phase-locked-loop (PLL) circuit having an input coupled to receive the encoded signal. In some embodiments, the carrier signal recovery circuit also includes a frequency divider coupled to an output of the PLL circuit.

The disclosed embodiments may be applicable to a number of different communication systems using various communication protocols such as phase-shift-key (PSK) encoding. While not so limited, for ease of explanation, the examples are described with reference to wireless communications using the ISO/IEC 14443-2 Very High Bit Rates (VHBR) communication protocol. International standard ISO/IEC 14443 is the industry standard for contactless smart cards, and the communication protocols associated therewith. ISO/IEC 14443-compliant products provide RF-communication technology for transmitting data between a card or tag and a reader device. For example, in electronic ticketing for public transport, travelers can wave a smart card over a reader at the turnstiles or entry point, benefiting from improved convenience and speed in the ticketing process. Such products can be important to individual mobility, and can support multiple applications such as road tolling, airline tickets, and access control. One proposed amendment to the ISO/IEC 14443 standard, referred to as Very High Bit Rates (VHBR) or ISO/IEC 14443-2, provides increased data rate capabilities.

Figure 2:
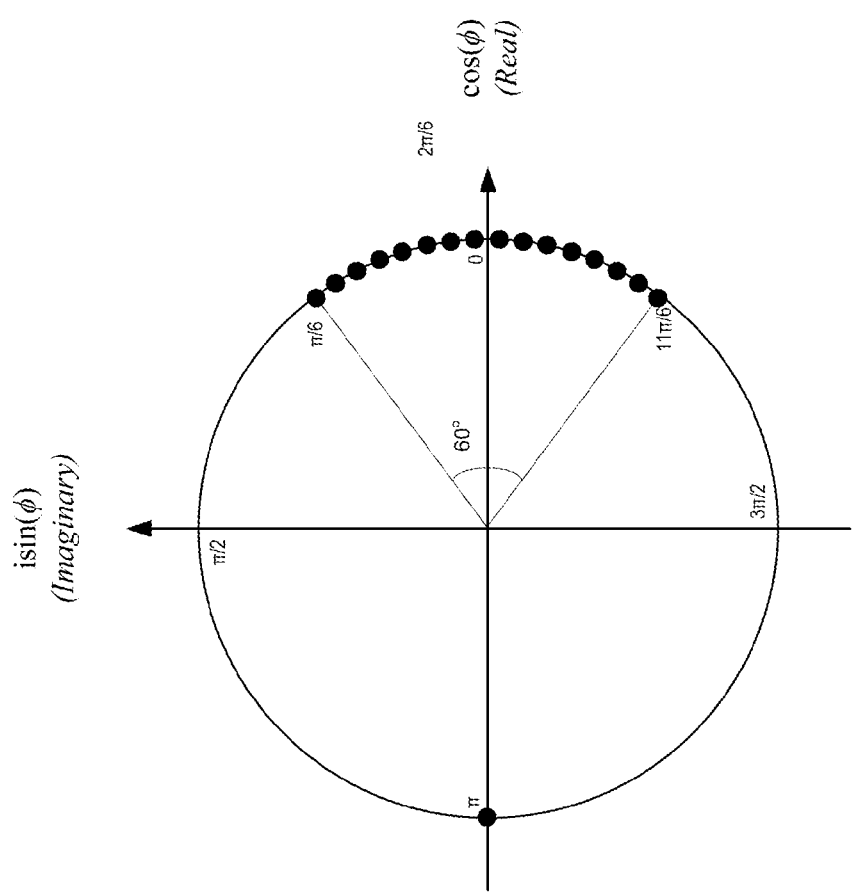
FIG. 2 shows a symbol constellation having a plurality of encoded symbols and an end of communication symbol, in accordance with one or more embodiments.

As described in more detail with reference to FIG. 2, ISO/IEC 14443-2 VHBR utilizes a phase-shift keying (PSK) modulation, having data symbols located within a designated phase range of a symbol constellation map. The PSK modulation also has a special symbol, indicative of an end of a communication, located at a phase outside of the designated phase range of the data symbols. One or more disclosed embodiments provide hardware efficient circuitry for decoding data symbols and for detecting symbols indicative of an end of communication.

Turning now to the figures, FIG. 1 shows a block diagram of an apparatus for receiving and processing encoded data. The apparatus includes an interface circuit 102 for receiving an encoded signal. The apparatus also includes a carrier signal recovery circuit 110 coupled to receive an encoded signal from an output of the interface circuit 102. The carrier signal recovery circuit 110 determines and outputs a carrier signal (I) of the encoded signal. The carrier signal recovery circuit 110 also generates and outputs a second signal (Q) that is 90 degrees out of phase with the carrier signal. The apparatus also includes a decoding circuit 130, coupled to the output of the interface circuit 102 and to the carrier signal recovery circuit. The decoding circuit 130 decodes the encoded signal as a function of both the encoded signal and the carrier signal (I) output by the carrier signal recovery circuit 110.

The apparatus also includes an end of a communication (EOC) detector 120, coupled to the output of the interface circuit 102 and to the carrier signal recovery circuit 110. The EOC detector 120 detects an indication of an end of a communication in the encoded signal as a function of both the encoded signal and the second signal (Q).

FIG. 2 shows an example symbol constellation having a plurality of encoded symbols and an EOC symbol. The symbol constellation includes 16 possible constellation points, which may be used to communicate up to 4-bits of data in each data symbol. In this example, the 16 constellation points for the data symbols are located in a 60 degree phase range on the right side of the constellation diagram, from $11\pi/6$ to $\alpha/6$. The constellation also includes a symbol located at $\pi$ that may be used to indicate the end-of-communication (EOC).

The embodiments are not limited to the symbol constellation map shown in FIG. 2. Rather, various embodiments may be used to detect an end of communication using a number of symbol constellation maps, having data symbols contained in a first phase range (e.g., the right side of the constellation map from $37\pi/2$ to $\pi/2$) and an EOC symbol located outside of the first phase range (e.g., the left side of the constellation map from $\pi/2$ to $3\pi/2$).

Figures 1, 3:
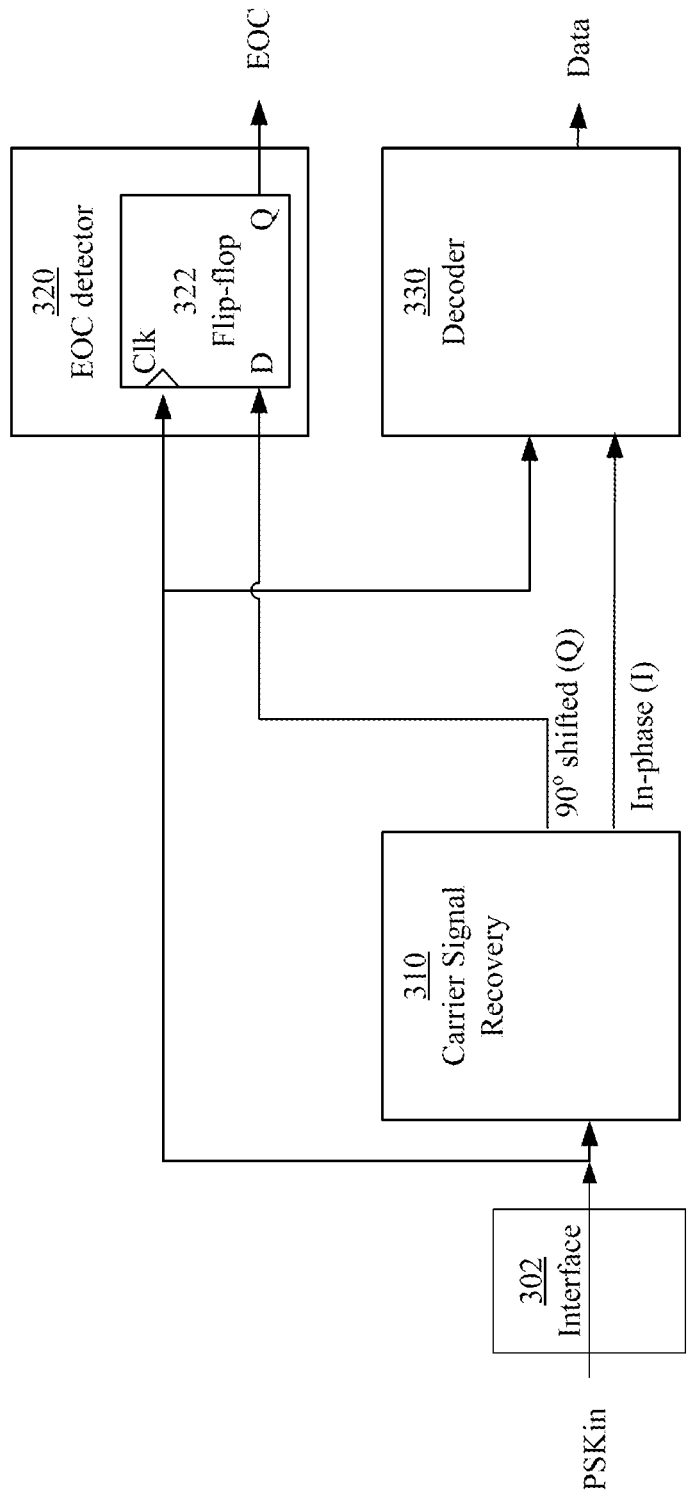
Figures 2, 3:
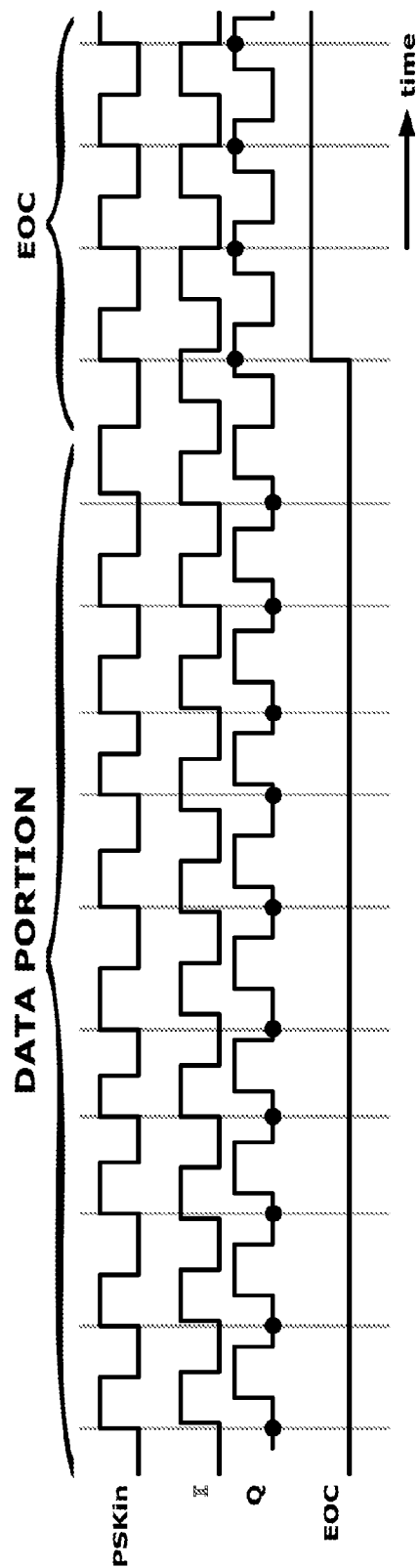

FIG. 3-1 shows a first circuit for receiving and processing encoded data. The circuit includes an interface circuit 302, a carrier signal recovery circuit 310, an EOC detector 320, and a decoding circuit 330, configured and arranged similar to the interface circuit 102, the carrier signal recovery circuit 110, the EOC detector 120, and the decoding circuit 130 described with reference to FIG. 1.

Different embodiments may include various circuits for decoding the encoded signal, depending on the communication protocol used to encode the encoded signal. In the example shown in FIG. 3-1, the decoding circuit is configured to decode the PSK encoded signal (PSKin). In some implementations, the decoding circuit 330 includes a time-to-digital converter (TDC) configured to decode the PSK encoded signal (PSKin) using the in-phase carrier signal (I) provided by the carrier signal recovery circuit 310. Alternatively, other circuits may be used decode the PSK encoded signal (PSKin) based on a phase difference between the PSK encoded signal (PSKin) and the in-phase carrier signal (I).

In this example, the EOC detector circuit 320 includes a flip-flop 322 having a D-input terminal coupled to receive the 90 degree phase-shifted carrier signal (Q) from the carrier signal recovery circuit 310. The flip-flop 322 also has a clock input coupled to receive the encoded signal (PSKin). In this arrangement, the flip-flop 322 samples values of the phase-shifted carrier signal (Q) at times at which a rising edge of the encoded data signal is received.

FIG. 3-2 illustrates the sampling performed by the flip-flop to detect the EOC symbol. In this example, data symbols are encoded by modulating the phase at which rising edges occur in the encoded data signal (PSKin) with reference to the in-phase carrier signal (I). The phase-shifted carrier signal (Q) has a low value when a phase of the encoded signal is in a phase range from $37\pi/2$ to $\pi/2$, which includes the phase range of the symbol constellation having the data symbols. Accordingly, if a rising edge of the encoded signal occurs when the phase-shifted carrier signal (Q) is low, the encoded data symbol is in the phase range from $37\pi/2$ to $\pi/2$. Conversely, if a rising edge of the encoded signal occurs when the phase-shifted carrier signal (Q) signal is high, the encoded symbol is in the phase range from $\pi/2$ to $37\pi/2$. Therefore, if a high value of the phase-shifted carrier signal (Q) is sampled by the flip-flop 322, in response to a rising edge of the encoded data signal, an EOC data symbol (located at $\pi$ in the symbol constellation) has been detected in the encoded data signal.

As described above, flip-flop 332 samples values of the phase-shifted carrier signal (Q) at rising edges of the encoded data signal. The sampled points of the phase-shifted carrier signal (Q) are marked by circles in FIG. 3-2. The bottom waveform (EOC) indicates the output of the flip-flop 332 shown in FIG. 3-1. As shown in FIG. 3-2, the output of the flip-flop is low when sampled Q values are low and is high when the sampled Q values are high.

Figures 1, 4:
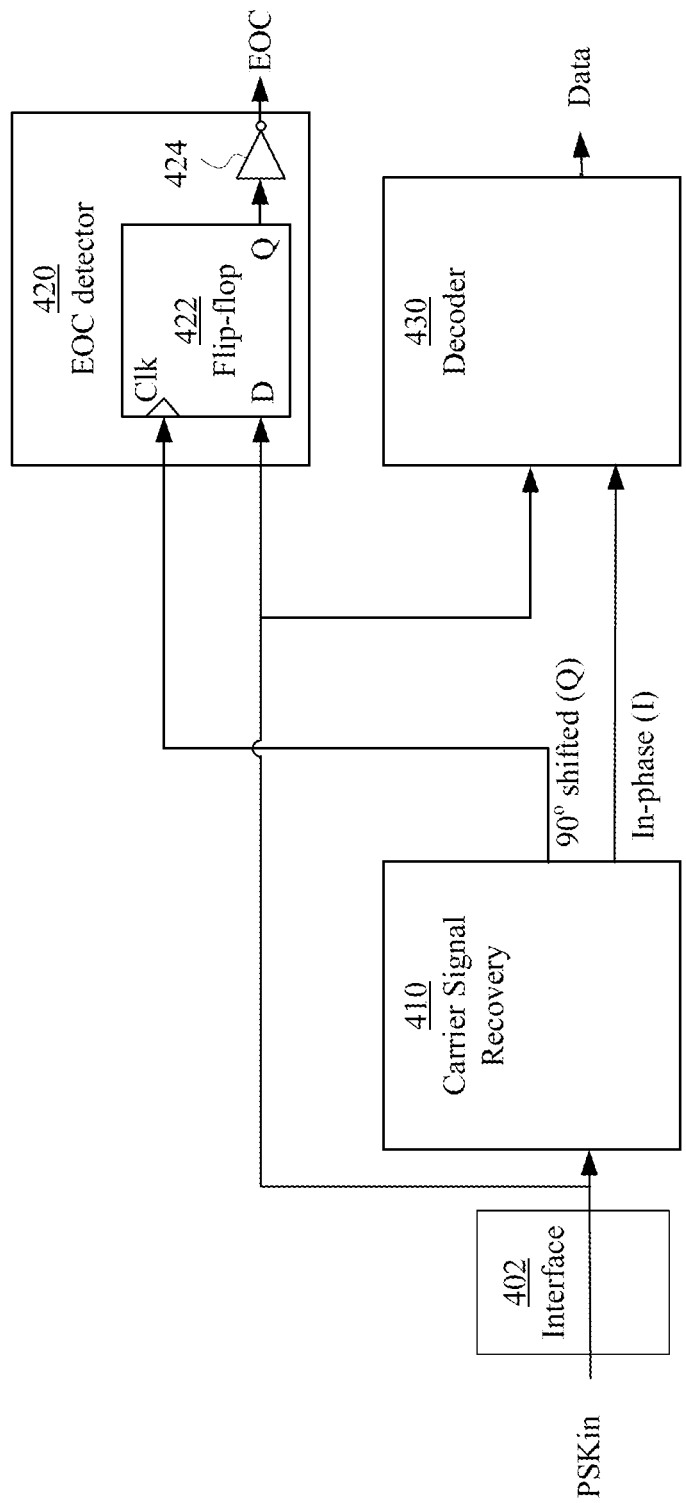
Figures 2, 4:
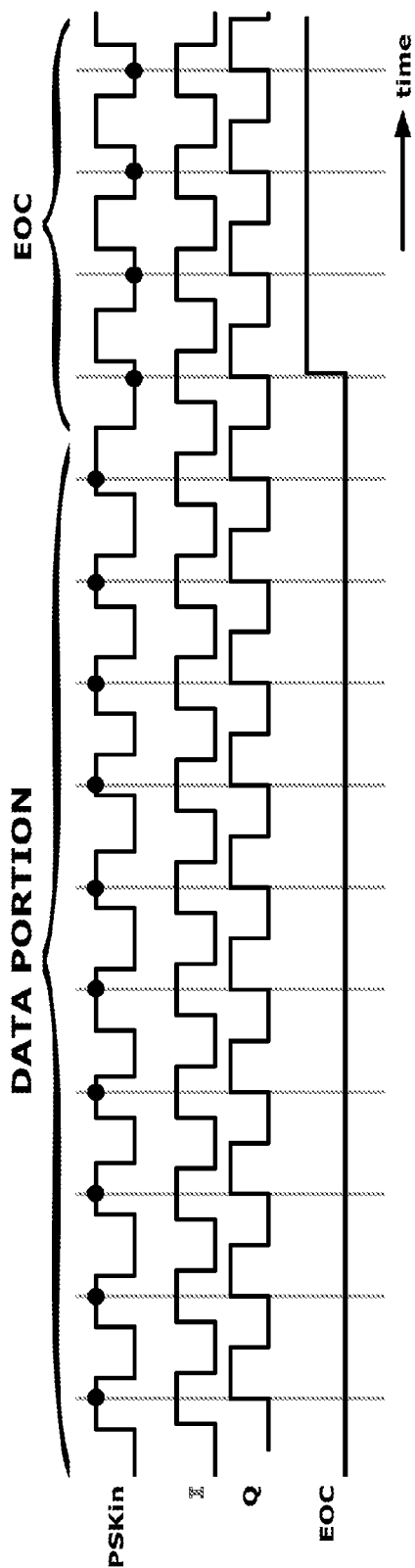

FIG. 4-1 shows a second circuit for receiving and processing encoded data. The circuit includes an interface circuit 402, a carrier signal recovery circuit 410, an EOC detector 420, and a decoding circuit 430, configured and arranged similar to the interface circuit 102, the carrier signal recovery circuit 110, the EOC detector 120, and the decoding circuit 130, described with reference to FIG. 1. The decoding circuit 430 is configured to decode a PSK encoded signal (PSKin). As described with reference to the decoding circuit 330, the decoding circuit 430 may include a time-to-digital converter (TDC) or other circuitry configured to decode the PSK encoded signal (PSKin) using the in-phase carrier signal (I) provided by the carrier signal recovery circuit 410.

In this example, the EOC detector circuit 420 includes a flip-flop 422 having a D-input terminal coupled to receive the encoded signal (PSKin). The flip-flop 422 also has a clock input coupled to receive the 90 degree phase-shifted carrier signal (Q) from the carrier signal recovery circuit 410. In this arrangement, the flip-flop 422 samples values of the encoded signal (PSKin) at times at which a rising edge of the phase-shifted carrier signal (Q) is received.

FIG. 4-2 illustrates the sampling performed by the flip-flop 422 to detect the EOC symbol. In this PSK example, data symbols are encoded by modulating the phase at which rising edges occur in the encoded data signal (PSKin) with reference to the in-phase carrier signal (I). When the encoded data signal (PSKin) is sampled at rising edges of the phase-shifted carrier signal (Q), the sampled values are high if the symbol of PSKin is in a phase range from $3\pi/2$ to $\pi/2$, which is reserved for data symbols in the symbol constellation shown in FIG. 2. Conversely, the sampled values are low if the sampled symbol of PSKin is in a phase range from $\pi/2$ to $3\pi/2$, which is reserved for EOC symbols in the symbol constellation shown in FIG. 2. Therefore, if a low value of the encoded signal (PSKin) is sampled by the flip-flop 422, in response to a rising edge of the phase-shifted carrier signal (Q), the EOC data symbol (located at $\pi$ in the symbol constellation) has been detected in the encoded data signal. In the example shown FIG. 4-1, EOC detector 420 includes an inverter 424 that inverts the output of the flip-flop 422 to provide the EOC signal shown in the bottom waveform. As shown in FIG. 4-1, the resulting EOC signal has a low value when the PSKin signal includes data symbols. Conversely, the resulting EOC signal has a high value when the PSKin signal includes an EOC symbol.

Figure 5:
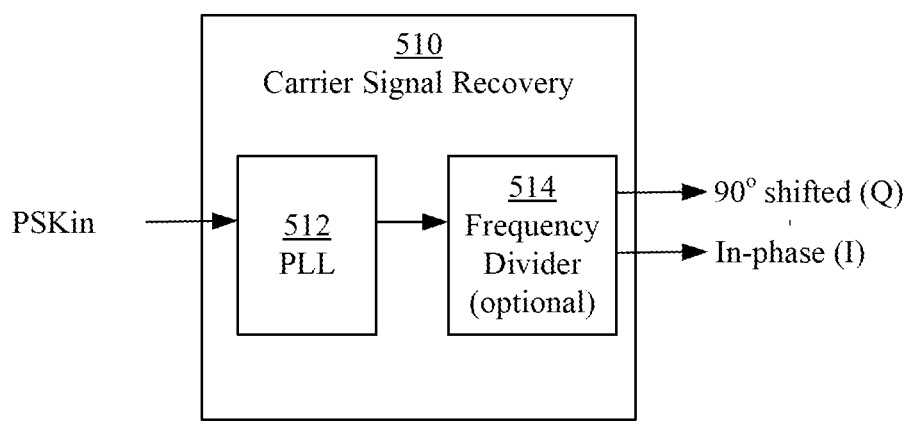
FIG. 5 shows an example carrier signal recovery circuit, in accordance with one or more embodiments.

FIG. 5 shows an example carrier signal recovery circuit 510, which may be used to implement the carrier signal recovery circuits 110, 310, and 410 of the above examples. The carrier signal recovery circuit 510 includes a phase-locked-loop (PLL) 512, which generates and outputs a carrier signal of an input signal (PSKin). In this example, the carrier signal recovery circuit 510 includes a frequency divider 514 following the PLL circuit to generate the two quadrature signals (I and Q) from the carrier signal output by the PLL. The I signal is in-phase with the carrier signal provided by the PLL. The Q signal is 90 degrees out of phase with the carrier signal. In some embodiments, the PLL 512 generates the two quadrature signals (I and Q) and the frequency divider 514 is omitted.

The interface circuits in the above examples may be implemented differently in various applications. In some applications, the interface circuit may include a simple circuit for providing a signal to the carrier signal recovery circuit, the detection circuit and the decoding circuit. In some applications, the interface circuit may include additional circuits for performing various operations including, but not limited to, receiving signals, filtering signals, amplification of signals, power generation, and/or protection against electrostatic discharge.

Figure 6:
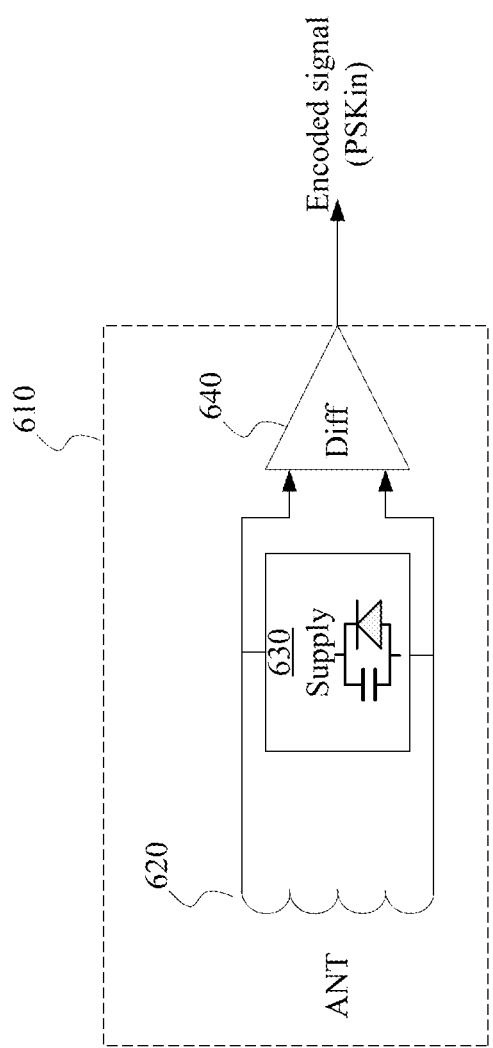
FIG. 6 shows an example interface circuit for receiving and processing encoded data, in accordance with one or more embodiments.

FIG. 6 shows an example interface circuit in accordance with one or more disclosed embodiments. In this example, interface circuit 610 includes an antenna 620 for receiving RF signals. A difference amplifier 640 is coupled to the antenna 620 and is configured to convert differential signals induced in the antenna to a single-ended signal (e.g., PSKin) that is provided to a carrier signal recovery circuit (e.g., 110, 310, or 410). In this example, the interface circuit 610 also includes a power supply circuit 630, which generates a power supply voltage from RF signals induced in the antenna. The power supply voltage may be used, for example, to power circuits of a passive RFID device or smartcard.

Various blocks, modules, or other circuits may be implemented to carry out one or more of the operations and activities described herein and/or shown in the figures. For example, various circuits and components of some of the above-discussed embodiments may be implemented using discrete logic circuits or programmable logic circuits, configured and arranged for implementing the above described operations/activities. In certain embodiments, such a programmable circuit is one or more computer circuits, programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Based upon the above discussion and illustrations, those skilled in the art will readily recognize that various modifications and changes may be made to the various embodiments without strictly following the exemplary embodiments and applications illustrated and described herein. For example, some embodiments may include a combination of aspects illustrated separately in respective figures. Such modifications do not depart from the true spirit and scope of various aspects of the invention, including aspects set forth in the claims.

What is claimed is:

1. An apparatus, comprising:
  a carrier signal recovery circuit configured and arranged to receive an encoded signal and to respond by
    determining and outputting a carrier signal of the encoded signal, and
    generating and outputting a second signal that is out of phase with the carrier signal; and
  circuitry coupled to the carrier signal recovery circuit and configured and arranged to decode the encoded signal as a function of the encoded signal and the carrier signal output by the carrier signal recovery circuit and to detect an indication of an end of a communication in the encoded signal as a function of the encoded signal and the second signal by sampling values of the second signal at times relative to an edge of the encoded signal being received.

2. The apparatus of claim 1, wherein the second signal is 90 degrees out of phase with the carrier signal, and wherein the circuitry includes a circuit configured and arranged to detect the edge of the encoded signal.

3. The apparatus of claim 1, wherein the encoded and second signals correspond to two quadrature signals derived from the carrier signal, and wherein the circuitry is further configured and arranged to compare the second signal with the encoded signal.

4. The apparatus of claim 1, further including a phase-locked-loop circuit and wherein the circuitry includes a frequency divider following the phase-locked-loop circuit, and wherein the encoded and second signals correspond to two quadrature signals derived from the carrier signal by the phase-locked-loop circuit.

5. The apparatus of claim 1, wherein the carrier signal recovery circuit includes a phase-locked-loop (PLL) circuit.

6. The apparatus of claim 1, wherein the carrier signal recovery circuit includes a phase-locked-loop (PLL) circuit and further includes a frequency divider coupled to an output of the PLL circuit.

7. The apparatus of claim 1, wherein the circuitry coupled to the carrier signal recovery circuit includes a time-to-digital converter.

8. The apparatus of claim 1, wherein the encoded signal is a phase-shift-key (PSK) encoded signal.

9. The apparatus of claim 1, further including a loop antenna, configured and arranged before the carrier signal recovery circuit for providing the encoded signal to the carrier signal recovery circuit.

10. The apparatus of claim 1, further including
  a power supply coupled to a loop antenna and configured and arranged to generate a power supply voltage from electro-magnetic signals received by the loop antenna;
  the loop antenna, configured and arranged before the carrier signal recovery circuit for providing the encoded signal to the carrier signal recovery circuit;
  a phase-locked-loop circuit;
  a frequency divider including within the circuitry and following the phase-locked-loop circuit, and wherein the encoded and second signals correspond to two quadrature signals derived from the carrier signal by the phase-locked-loop circuit; and
  a signal amplification circuit configured and arranged with input ports coupled to the loop antenna and configured and arranged to provide a signal corresponding to the encoded signal received by the carrier signal recovery circuit.

11. The apparatus of claim 10, wherein the circuitry includes a flip-flop having an input terminal connected to receive the encoded signal and having a clock terminal connected to receive the second signal from the carrier signal recovery circuit.

12. The apparatus of claim 10, wherein the circuitry includes a flip-flop having an input terminal connected to receive the encoded signal and having a clock terminal connected to receive the second signal from the carrier signal recovery circuit and further includes a logical inverter circuit having an input coupled to an output of the flip-flop and an output coupled to an output of the circuitry.

13. The apparatus of claim 1, wherein the circuitry includes a flip-flop having an input terminal connected to receive the second signal from the carrier signal recovery circuit and having a clock terminal connected to receive a signal corresponding to the encoded signal, and further including
- a power supply coupled to a loop antenna and configured and arranged to generate a power supply voltage from electro-magnetic signals received by the loop antenna;
- the loop antenna, configured and arranged for near-field communication and further configured and arranged before the carrier signal recovery circuit for providing the encoded signal to the carrier signal recovery circuit;
- a phase-locked-loop circuit;
- a frequency divider including within the circuitry and following the phase-locked-loop circuit, and wherein the encoded and second signals correspond to two quadrature signals derived from the carrier signal by the phase-locked-loop circuit; and
- a signal amplification circuit configured and arranged with input ports coupled to the loop antenna and configured and arranged to provide a signal corresponding to the encoded signal received by the carrier signal recovery circuit.

14. The apparatus of claim 13, wherein the carrier signal recovery circuit includes a phase-locked-loop (PLL) circuit.

15. The apparatus of claim 13, wherein the carrier signal recovery circuit includes a phase-locked-loop (PLL) circuit and further includes a frequency divider coupled to an output of the PLL circuit.

16. The apparatus of claim 13, wherein the circuitry includes a time-to-digital converter.

17. The apparatus of claim 13, wherein the encoded signal is a phase-shift-key (PSK) encoded signal.

18. A method of wireless data communication, comprising:
- receiving over an antenna a wireless signal;
- determining, in response to receiving the wireless signal, a carrier signal of an encoded signal;
- phase shifting the carrier signal to produce a second signal that is out of phase with the carrier signal;
- decoding the encoded signal as a function of the encoded signal and the carrier signal; and
- detecting whether or not the encoded signal includes an indication of an end of a communication in the encoded signal by comparing the second signal with the encoded signal.

19. The method of claim 18, wherein the wireless signal is conveyed using near-field communication and the encoded signal is a phase-shift-key encoded signal and further comprising:
- in response to the second signal having a first value at a time in which an edge of the encoded signal is detected, signaling that the indication of an end of a communication is not received; and
- in response to the second signal having a second value at a time in which an edge of the encoded signal is detected, signaling that the indication that an end of a communication is received.

* * * * *